United States Patent
Zanetti et al.

(10) Patent No.: US 11,543,607 B2
(45) Date of Patent: Jan. 3, 2023

(54) IROVF STANDARD TO TRANSPORT UNCOMPRESSED UNPROCESSED AUDIO VIDEO DATA AND MIXED SIGNALS OVER FIBER BASED AOC ACTIVE OPTICAL CABLES ADDED WITH INTEGRATED IR INFRARED REMOTE CONTROL

(71) Applicant: Fiber Command LLC, Camden, DE (US)

(72) Inventors: Luca Zanetti, Orlando, FL (US); Silvia Fioravanti, Orlando, FL (US)

( * ) Notice: Subject to any disclaimer, the term of this patent is extended or adjusted under 35 U.S.C. 154(b) by 0 days.

(21) Appl. No.: 16/743,412

(22) Filed: Jan. 15, 2020

(65) Prior Publication Data
US 2021/0215896 A1    Jul. 15, 2021

(51) Int. Cl.
G02B 6/44 (2006.01)
G02B 6/42 (2006.01)
G02B 6/10 (2006.01)

(52) U.S. Cl.
CPC ........... *G02B 6/4416* (2013.01); *G02B 6/102* (2013.01); *G02B 6/4277* (2013.01); *G02B 6/443* (2013.01); *G02B 6/4284* (2013.01); *G02B 6/4293* (2013.01)

(58) Field of Classification Search
CPC .................................................. G02B 6/4416
See application file for complete search history.

(56) References Cited

U.S. PATENT DOCUMENTS

| | | |
|---|---|---|
| 7,386,641 B2 | 6/2008 | Xu et al. |
| 7,548,675 B2 | 6/2009 | Tatum et al. |
| 7,778,510 B2 * | 8/2010 | Aronson .............. G02B 6/4416 385/101 |
| 8,150,261 B2 | 4/2012 | Tzeng et al. |
| 8,930,610 B2 | 1/2015 | Tsinberg et al. |
| 9,148,609 B2 | 9/2015 | Shintani et al. |
| 9,397,750 B2 | 7/2016 | Parekh et al. |
| 10,282,979 B2 | 5/2019 | Aggarwal et al. |
| 2006/0288139 A1 | 12/2006 | Lee et al. |

(Continued)

FOREIGN PATENT DOCUMENTS

| | | |
|---|---|---|
| CN | 210431431 | 4/2020 |
| JP | 2005223537 | 8/2005 |

OTHER PUBLICATIONS

Paul Kish, Category 6 Cabling Questions and Answers; NORDX/CDT; Jul. 2002; retrieved from the Internet <URL https://web .archive .org/web/20150923183329/http//:1/www .belden.com/docs/upload/what_is_category_6 q-a .pdf#> (Year: 2002).

*Primary Examiner* — Michelle R Connelly
(74) *Attorney, Agent, or Firm* — Barry Choobin; Patent 360

(57) ABSTRACT

Infrared Remote Over Video Fiber (IROVF) transports any combination of uncompressed/unprocessed/native full quality, full bandwidth, zero latency, and mixed analog and digital signals including audio, video, data, Ethernet, USB, S/PDIF, and TOSLINK, over a fiber optic based cable added with integrated infrared remote control capabilities to remote control uni/bi-directional audio video and IR devices remotely from either sides of the cable Without requiring additional processing adapters, nor processing or reducing the specs of the other carried audio-video data signals which stays original uncompressed, untouched, and unprocessed for a perfect as-is full original functionality and quality.

20 Claims, 3 Drawing Sheets

(56) References Cited

U.S. PATENT DOCUMENTS

| | | |
|---|---|---|
| 2007/0286600 A1 | 12/2007 | Guo et al. |
| 2008/0043823 A1 | 2/2008 | Lin et al. |
| 2008/0291074 A1 | 11/2008 | Tzeng et al. |
| 2009/0245804 A1 | 10/2009 | Garner et al. |
| 2010/0095342 A1 | 4/2010 | Gandhi et al. |
| 2010/0220692 A1 | 9/2010 | Diab et al. |
| 2012/0008904 A1* | 1/2012 | Han ............... H02G 3/0481 |
| | | 385/101 |
| 2012/0011286 A1 | 1/2012 | Wong et al. |
| 2012/0141132 A1 | 6/2012 | Walker |
| 2013/0077640 A1* | 3/2013 | Jiang ............... G02B 6/4249 |
| | | 370/464 |
| 2013/0236188 A1 | 9/2013 | Hung et al. |
| 2013/0294735 A1 | 11/2013 | Burris et al. |
| 2014/0016034 A1* | 1/2014 | Cirstea ............. H04N 7/108 |
| | | 348/460 |
| 2014/0092311 A1 | 4/2014 | Tsinberg et al. |
| 2015/0295647 A1 | 10/2015 | Parekh et al. |
| 2017/0244950 A1* | 8/2017 | Talstra ............. H04N 13/178 |
| 2018/0190109 A1* | 7/2018 | Aggarwal ......... H04Q 11/0005 |
| 2018/0308349 A1* | 10/2018 | Hsu ................. H04B 10/1143 |
| 2019/0356090 A1* | 11/2019 | Lei ................. H01R 13/506 |

* cited by examiner

IROVF STANDARD TO TRANSPORT UNCOMPRESSED UNPROCESSED AUDIO VIDEO DATA AND MIXED SIGNALS OVER FIBER BASED AOC ACTIVE OPTICAL CABLES ADDED WITH INTEGRATED IR INFRARED REMOTE CONTROL

FIELD OF INVENTION

The present invention relates to a fiber-based optic cable also sometime called active optical cable (AOC) added with the ability to transport infrared (IR) unidirectional and/or bi-directional infrared remote control commands together with unprocessed and uncompressed audio, video, USB, ethernet, TOSLINK, and data signals in single or multiple mixed combinations, to replace classic Cat-X cables and processing adapters or extenders with a single infrared remove over video fiber (IROVF) standard slim cable capable to serve all the full quality Hi-Speed uncompressed connections to any room or place at once, plus the infrared and Serial remote control from any side of the IRVOF cable to any home, commercial, professional, and any other audio video data distribution and wiring application installation.

SUMMARY OF THE INVENTION

The present invention which is an Infrared Remote Over Video Fiber (IROVF) allows to transport any combination of uncompressed/unprocessed/native full quality, full bandwidth, and zero latency mixed, analog, and digital signals including audio-video data, ethernet, USB, S/PDIF, and TOSLINK over a fiber optic based cable, also called AOC, added with integrated infrared remote control capabilities to remote control unidirectional and bidirectional audio-video and IR devices remotely from both sides of the cable.

The IROVF is the invention of adding infrared mechanism to fiber opticbased AOC cables, as well the combination of one or multiple audios, video, data, ethernet, USB, and TOSLINK uncompressed, unprocessed, and zero lag signals within the same AOCbased cable added with infrared and/or serial remote control.

DETAILED DESCRIPTION

Figure 1:
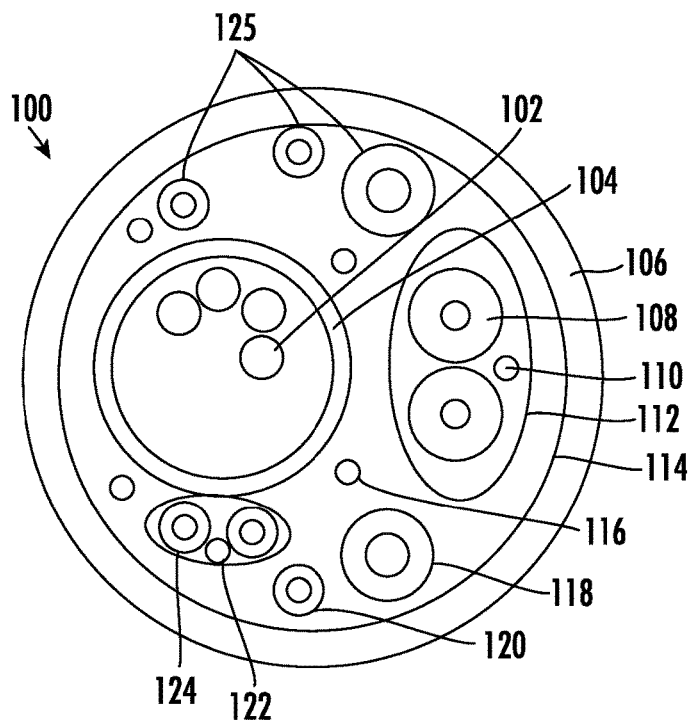
FIG. 1 is a cross-sectional view of an Infrared Remote Over Video Fiber (IROVF) in which various aspects of the disclosure may be implemented.

IROVF also suggests a guideline about how the fiber optic-based cable can be realized as well suggests a main color coding for the wires to standardize the connections across multiple IROVF licensed manufacturers of both cables and connectors.

IROVF propose a next-generation standard to connect and distribute uncompressed/unprocessed/native full quality, full bandwidth, and zero latency audio-video data signals added with infrared and/or serial native remote control in any application, such as homes, commercial locations, education, hospitality, virtual reality, parks, sports, military, and any other application where uncompressed zero-lag, native, full quality audio-video data distribution with integrated infrared and/or serial remote control is needed.

IROVF can also be defined as a standard to build the next generation audio-video data and to control uncompressed AOC based multimedia extender cable solutions, including HDMI AOC extenders, SDI AOC extenders, USB AOC extenders, Ethernet AOC extenders, Gaming AOC extenders, and the like.

An object of the present invention is to evolve from the huge limits of a typical home & commercial audio-video data wiring based over Cat-5, Cat-6, Cat-7, Cat-8, and Cat-x twisted pairs cables which cannot distribute the modern 4K or 8K uncompressed 18 gigabit or 48 gigabit video signals, nor cannot distribute multiple audio-video ethernet signals all together to each room or location over the same Cat-x cable without using processing extenders which require extra power supplies and introduces a lag with substantial loss of quality and speed by using a compression processing mechanism, to a modern, more convenient, simpler, and cost effective slim cable solution (the IROVF STANDARD CABLE) which transports uncompressed, unprocessed, full bandwidth, full quality original audio-video data, ethernet, and TOSLINK signals to each room and location having the same IROVF slim cable together with a full featured unidirectional or bidirectional infrared/serial remote control system which allows the remote control of audio-video automation and any IR or serial device from both sides of the cable.

An object of the present invention is to simplify the audio video multimedia distribution in homes, commercial, professional, military, educational, medical, and any other installation, improving security, and environmental health as IRVOF does not requires additional external signal processor box, converters, and extenders which have their own power supplies resulting in additional energy consumption and additional environmental pollution in a long term.

To achieve these goals, the IROVF cable is connected at both sides to specific audio-video data and infrared connectors, directly or through sub connectors.

Each audio-video, ethernet, USB, and TOSLINK data connector can be added or integrated with an infrared electric block.

The infrared blocks can receive and transmit to each other the infrared commands captured and emitted in the rooms via IR EYES transmitters and receivers sensors connected to the IR blocks.

The IR EYES can receive and/or transmit IR commands from IR remote controls such as TV remote controls, home automation controls, control tablets and phones, programmable IR remote controls to audio-video TV systems and any IR controllable devices.

The IR EYES can be integrated directly on the AOC based cable connectors housing shells and/or IR blocks housing shells of the fiber-based AOC cable.

The IR EYES can also be separate parts with a wire connected to the main fiber-based cable or directly on the main AOC connector housing via pluggable connectors such as a 3.5 mm jack or any other, where these pluggable IR ports can be installed and integrated directly inside the AOC based cable connector housing shell, or floating connectors from the cable.

The IR EYES might also be already connected/wired to each side of the main AOC based cable or AOC main connector.

The typical installation of the IR-EYE Receiver is via adhesive in front of the viewing TV, so the IR EYE can see and capture IR commands coming from the room remote control(s) and send them to the other side of the fiber-optic-based AOC cable reproducing them through the IR-EYE transmitter in front of the remote controllable destination(s), controlling it.

Some TV sets also provide a plug-in jack on the rear TV connections to use the TV IR EYE built-in into the TV in place of installing another adhesive IR eye in front of the TV, usually on the TV bezel. In this case, the TV IR EYE jack can be connected directly to the IR block so the IR commands will be captured and delivered to the other side of the AOC-based cable directly from the IR EYE built into the TV.

The Copper and/or fiber optic infrared audio-video, ethernet, USB and TOSLINK cables, connectors and mechanism herein described can also be added with additional data connections and connectors, such as ethernet, serial, audio, video, data, TOSLINK, S/PDIF, SDI video, multiple SDI video up to 8k and higher, AES/EBU, composite video, component video, and any other audio-video data connection, to create an infrared cable and mechanism with multiple multi-standard connections and combination, so the infrared mechanism will be able not only to the remote control and remote multimedia devices from each-other sides of the IROVF cable, but as well other different non-multimedia devices, while the IR integrated multi standard cable will offer multiple types of connection at once with the IR control feature.

By replacing the IR sensors with different source and destination devices, the invention allows the connection between any serial data communication devices within the same AOC cable, without disrupting, using or reducing the audio, video, ethernet, USB, and TOSLINK connection full standard and functionality (any type), without requiring additional external adapters converters, repeaters or external additional cables.

The connectors (or end points or terminations) of the IROVF can be created and organized independently one by one, or in a IROVF strip or in an IROVF wall plate with keystones.

For the standalone single connectors, the connectors might take their sub wires directly from the main IROVF cable in an "octopus style" or from the main video connector as a "pass-through" mechanical design.

This is anyway not limiting the possibilities to construct and wire the IROVF mechanism/invention in any possible mechanical or electrical way, where the main key invention remains the fact that there is an infrared command mechanism integrated with an unprocessed uncompressed audio/video link over copper and/or fiber-based cable.

The IROVF suggests 3 main types of cables layouts:
IROVF suggests a guideline to realize 3 types of fiber based AOC cables:
TYPE 1: IROVF-LT application: video distribution+IR remote control,
TYPE 2: IROVF-LTE application: IPTV/APP TELEVISION+in-room audio+video distribution+IR remote control,
TYPE 2: IROVF-LTE application: ZERO-LAG Gaming+IPTV/APP TELEVISION+in-room audio+video distribution+auxiliary controls & home automation/security+IR remote control.

Figure 2:
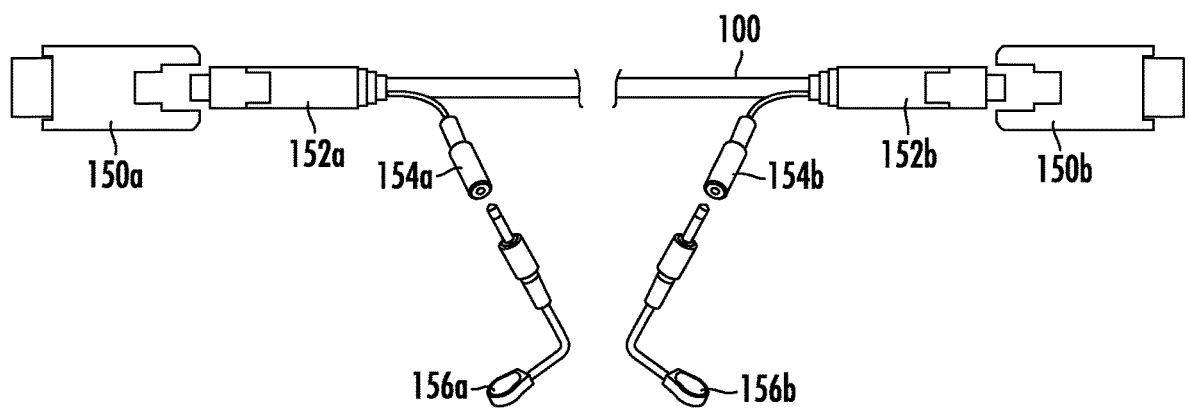
FIG. 2 is a schematic view of the IROVF of FIG. 1.

Referring now to FIGS. 1 and 2, a particular aspect of the IRVOF-LT (100) is illustrated as having four fibers and nine electrical wires. The IRVOF-LT includes a jacket (106) and a configuration as follows:

a. IROVF-LT>video IROVF standard cable with 4 fibers+9 electric wires:
Typ app: HDMI/SDI HD/4K/8K and higher+IR remote control–Video IRVOF Cable Extenders,
 2 wires with shield foil (108, 112) and ground wire (110) for IR infrared uni/bi-directional remote & serial control,
 2 wires with shield foil (124) and ground wire for data (122),
 5 wires for connection/data/handshaking/power supply/control (118, 120, 125),
 4 fibers (102) for video up to 48 Gbps and higher uncompressed for HD/4K/8k UHD and other/or higher resolutions within a fibers micro tube (104),
 anti-stretch Kevlar fibers (116),
 global cable shield foil (114).

The IROVF-LT standard cable (100) may include, at a first end, a full-size HDMI adapter (150a), a mini/micro HDMI connector (152a), and an IR connector (154a) in communication with an IR eye (156a). Similarly, at a second end of the cable (100), may include a full-size HDMI adapter (150b), a mini/micro HDMI connector (152b), and an IR connector (154b) in communication with an IR eye (156b).

Figure 3:
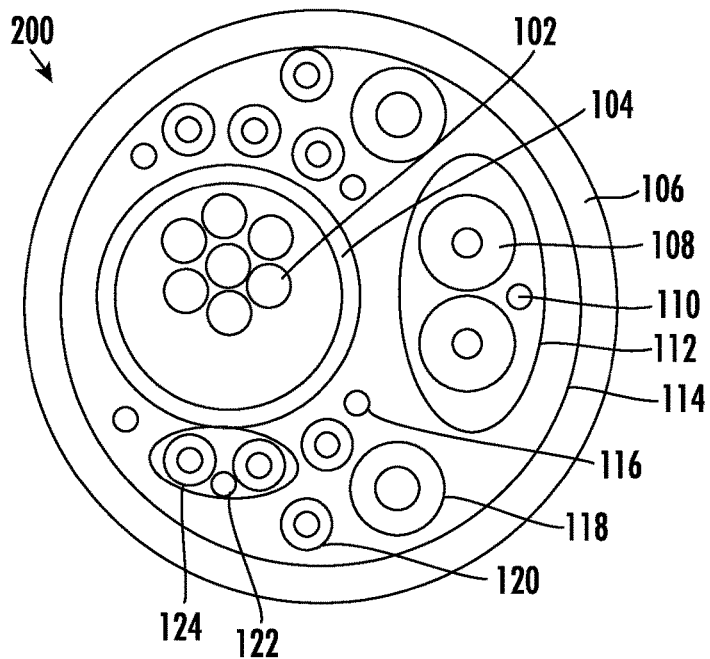
FIG. 3 is a cross-sectional view of another aspect of the IROVF of FIG. 1.
Figure 4:
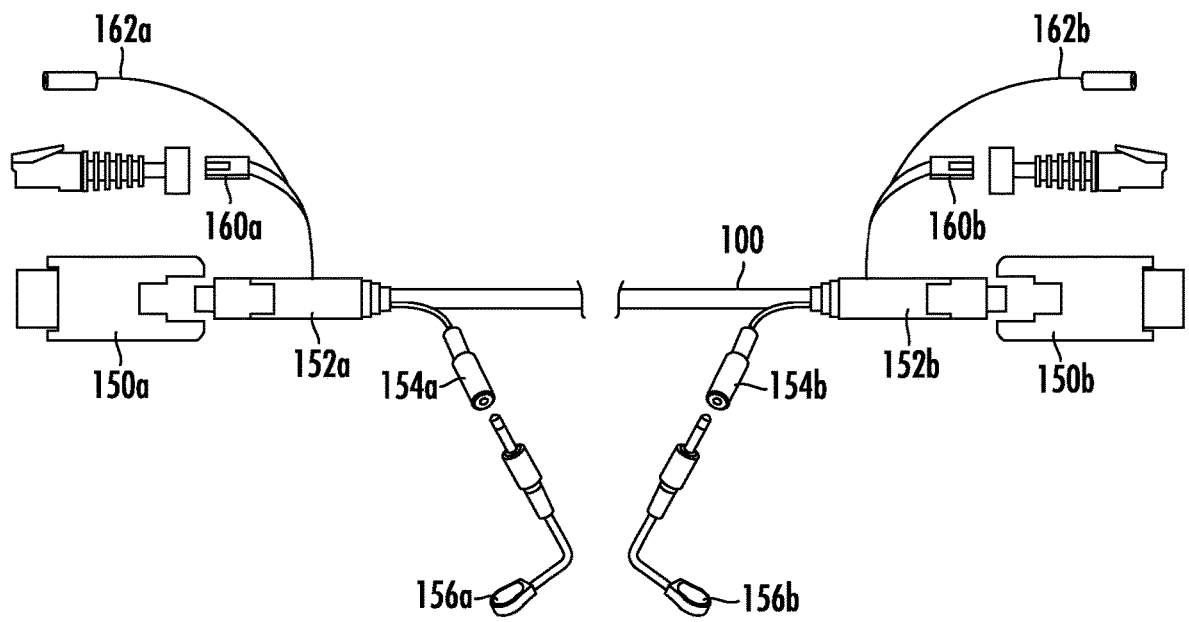
FIG. 4. is a schematic of the IROVF of FIG. 3.

Referring now to FIGS. 3 and 4, a particular aspect of the IRVOF-LTE (200) is illustrated as having seven fibers and twelve electrical wires. The IRVOF-LTE (200) includes a jacket (106) and a configuration as follows:
b. IROVF-LTE>IPTV enhanced IROVF standard cable with 7 FIBERS+12 electric wires:
Typ app: HDMI/SDI HD/4K/8K and higher+IR remote control+ETHERNET+TOSLINK–IPTV IRVOF Cable Extenders,
 2 wires with shield foil (108, 112) and ground wire (110) for IR infrared uni/bi-directional remote & serial control,
 2 wires with shield foil (124) and ground wire for data (122),
 5 wires for the connection/data/handshaking/power supply/control (118, 120, 125),
 3 wires for the auxiliary connection/data/handshaking/power supply/control,
 4 fibers (102) for video up to 48 Gbps and higher uncompressed for HD/4K/8k UHD and other or higher resolutions within a fibers microtube (104),
 2 fibers (102) for 10/100/1 gigabit—10 gigabit—48 gigabit and higher ethernet connection,
 1 fiber (102) for TOSLINK audio,
 anti-stretch Kevlar fibers (116),
 global cable shield foil (114).

The IROVF-LTE cable (200) may include, at the first end, a full-size HDMI adapter (150a), a mini/micro HDMI connector (152a), and an IR connector (154a) in communication with an IR eye (156a). Similarly, a second end of the cable (100) may include a full size HDMI adapter (150b), a mini/micro HDMI connector (152b), and an IR connector (154b) in communication with an IR eye (156b). In addition, the cable (200) may include an LC Ethernet 10/100/1000 10 Gigabit (4k/8k IPTV VR Gaming) connectors (160a, b) and a TOSLINK connector for uncompressed digital audio (162a, b).

Figure 5:
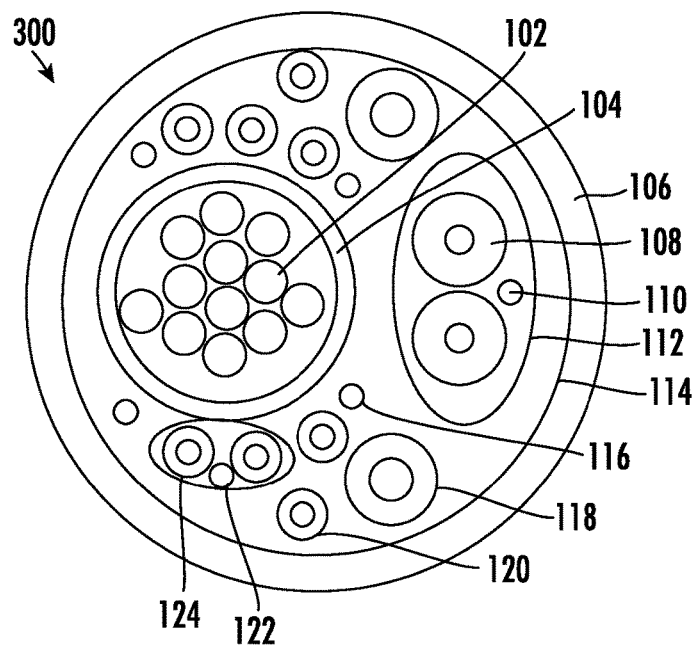
FIG. 5 is a cross-sectional view of another aspect of the IROVF of FIG. 1.
Figure 6:
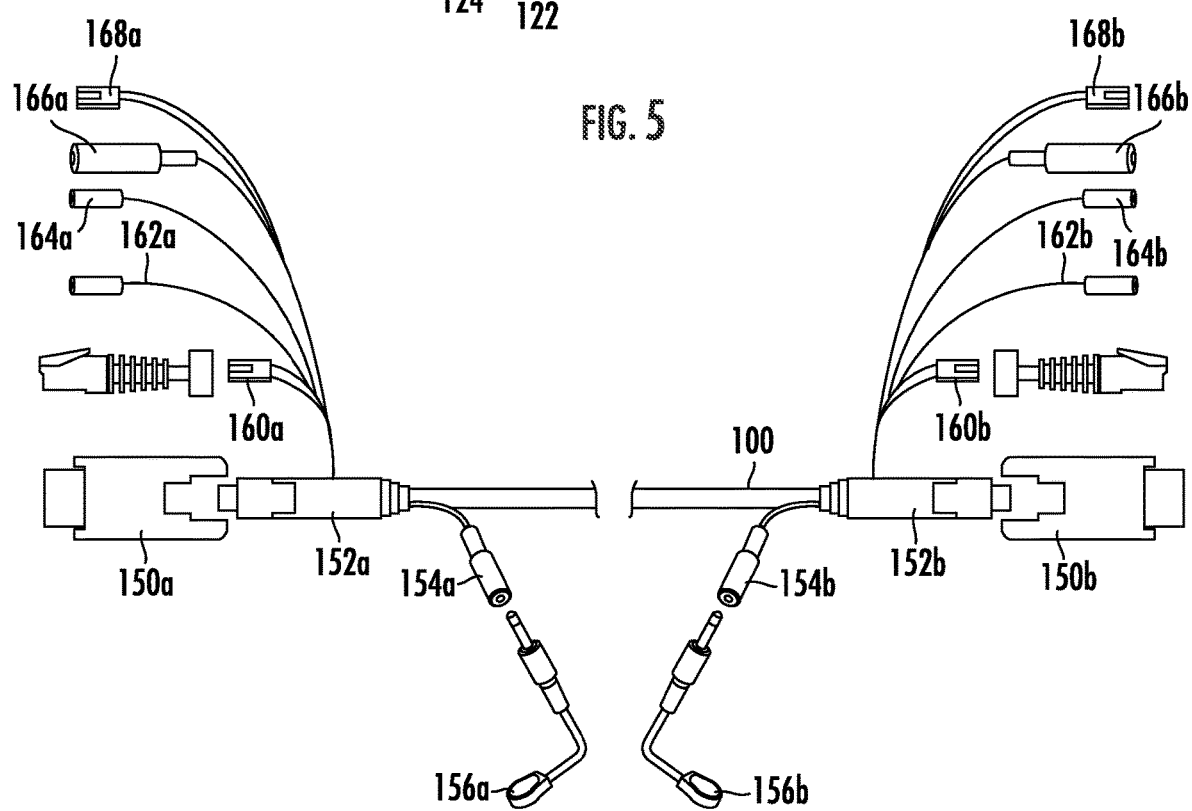
FIG. 6 is a schematic of the IROVF of FIG. 5.

Referring now to FIGS. 5 and 6, a particular aspect of the IRVOF is illustrated as having twelve fibers and twelve electrical wires. The IRVOF-LTX (300) includes a jacket (106) and a configuration as follows:
c. IROVF-LTX>gaming IROVF standard cable with 12 fibers+12 electric wires:

Typ app: HDMI/SDI HD/4K/8K and higher+IR remote control+Ethernet+2 TOSLINK+USB–Gaming IRVOF Cable Extenders,

- 2 wires with shield foil (108, 112) and ground wire (110) for IR infrared uni/bi-directional remote & serial control,
- 2 wires with shield foil (124) and ground wire for data (122),
- 5 wires for connection/data/handshaking/power supply/control (118, 120, 125),
- 3 wires for auxiliary connection/data/handshaking/power supply/Control,
- 4 fibers (102) for video up to 48 Gbps and higher uncompressed for HD/4K/8k UHD and other or higher resolutions within a fibers microtube (104),
- 2 fibers (102) for 10/100/1 gigabit—10 gigabit—48 gigabit and higher ethernet connection,
- 2 fiber (102) for bidirectional TOSLINK audio—1 fiber for TOSLINK audio,
- 4 fibers (102) for auxiliary data, control, audio, video, USB, ethernet, split video, and like,
- anti-stretch Kevlar fibers (116),
- global cable shield foil (114).

see IROVF-LTX suggested color coding and assignment in the figures section.

The IROVF-LTX cable (300) may include, at a first end, a full-size HDMI adapter (150a), a mini/micro HDMI connector (152a), and an IR connector (154a) in communication with an IR eye (156a). Similarly, at a second end of the cable (100), may include a full size HDMI adapter (150b), a mini/micro HDMI connector (152b), and an IR connector (154b) in communication with an IR eye (156b). In addition, the cable (300) may include an LC Ethernet 10/100/1000 10 Gigabit (4k/8k IPTV VR Gaming) connectors (160a, b) and a TOSLINK connector for uncompressed digital audio (162a, b). Furthermore, the cable (300) may include a USB (2.0/3.0 and higher) connectors (166a, b) and auxiliary dual fiber LC, 2nd Ethernet, 2nd USB, other busses, home controls, etc. connectors (168a, b).

The IROVF color coding is as follows:

| | | |
|---|---|---|
| 1) | MAIN VIDEO LINK | >4 FIBERS > RED + GREEN + BLUE + PINK |
| 2) | VIDEO LINK CONTROL | >7 WIRES > PINK + BROWN + RED + BLACK + WHITE and PURPLE + LIGHT BLUE within shield foil with ground wire |
| 3) | IR REMOTE CONTROL WITH GROUND WIRE | >2 WIRES > BLUE + GREY - WITHIN SHIELD FOIL |
| 4) | MAIN ETHERNET | >2 FIBERS > GREY + YELLOW |
| 5) | MAIN TOSLINK | >1 FIBER > BROWN |
| 6) | SECONDARY TOSLINK | >1 FIBER > PURPLE |
| 7) | MAIN USB | >2 FIBER > ORANGE + WHITE |
| 8) | AUX FIBER LINK | >2 FIBERS > LIGHT BROWN + LIGHT BLUE |
| 9) | AUX WIRES | >3 WIRES > YELLOW + ORANGE + GREEN |

IROVF Licensed manufacturers will follow the above color coding in order to guarantee inter-compatibility between devices and manufacturers and facilitate on-site installations and parts replacement/servicing.

What is claimed is:

1. A unitary signal communication cable, the cable comprising:
    - a first end having an infrared receiver configured for receiving a first set of infrared commands intended for a first device;
    - a second end opposite the first end and having an infrared transmitter configured to reproduce the first set of infrared commands to control a second device;
    - a plurality of fiber optics extending from the first end to the second end;
    - a plurality of electric wires coupled to the infrared receiver at the first end and extending to the infrared transmitter at the second end, and the plurality of electric wires configured to communicate the first set of commands from the infrared receiver to the infrared transmitter at the second end;
    - a plurality of shielding with a first shielding located around the plurality of fiber optics and a second shielding located around a respective number of the plurality of electric wires to provide for transmission of any combination of analog and digital signals without interference; and
    - an outer covering to provide for a unitary cable from the first end to the second end;
    - wherein at least two of the plurality of electric wires and including respective shielding provides for integrated infrared serial remote communications capabilities to control devices remotely from an opposing end of the cable.

2. The cable of claim 1, further comprising anti-stretch Kevlar fibers.

3. The cable of claim 1, wherein the outer covering comprises a shield foil.

4. The cable of claim 1, further comprising at least one ground wire.

5. The cable of claim 1, wherein the infrared receiver comprises an infrared eye.

6. The cable of claim 1, wherein the second end further comprises an infrared receiver configured to receive a second set infrared commands intended for the second device.

7. The cable of claim 6, wherein the first end further comprises an infrared transmitter configured to reproduce the second set of infrared commands to control the first device.

8. The cable of claim 7, wherein the cable is configured to communicate the second set of infrared commands from the second end to the first end.

9. A unitary signal communication cable, the cable comprising:
    - a first end having a first infrared receiver and transmitter, wherein the first infrared receiver and transmitter is configured for receiving and reproducing infrared commands;
    - a second end opposite the first end and having a second infrared receiver and transmitter, wherein the second infrared receiver and transmitter is configured for receiving and reproducing infrared commands;
    - a plurality of fiber optics extending from the first end to the second end; and
    - a plurality of electric wires coupled between the first infrared receiver and transmitter and the second infrared receiver and transmitter, wherein the plurality of electric wires are configured to communicate commands from a respective infrared receiver to a respective infrared transmitter at an opposing end.

10. The cable of claim 9, further comprising a plurality of shielding with a first shielding located around the plurality of fiber optics and a second shielding located around a respective number of the plurality of electric wires to provide for transportation of any combination of analog and digital signals without interference.

11. The cable of claim 10, wherein at least two of the plurality of electric wires and including respective shielding provides for integrated infrared serial remote communications capabilities to control devices remotely from an opposing end of the cable.

12. The cable of claim 9, further comprising an outer covering to provide for a unitary cable from the first end to the second end.

13. The cable of claim 12, wherein the outer covering comprises a shield foil.

14. The cable of claim 9, further comprising anti-stretch Kevlar fibers.

15. The cable of claim 9, further comprising at least one ground wire.

16. The cable of claim 9, further comprising an infrared eye coupled to each of the first infrared receiver and transmitter and the second infrared receiver and transmitter.

17. A unitary signal communication cable, the cable comprising:
    a first end having a first infrared eye configured for receiving and reproducing infrared commands;
    a second end opposite the first end and having a second infrared eye configured for receiving and reproducing infrared commands;
    a plurality of fiber optics extending from the first end to the second end;
    a plurality of electric wires coupled between the first infrared eye and the second infrared eye, wherein the plurality of electric wires are configured to communicate commands in either direction between the first infrared eye and the second infrared eye; and
    a plurality of shielding with a first shielding located around the plurality of fiber optics and a second shielding located around a respective number of the plurality of electric wires to provide for transportation of any combination of analog and digital signals without interference.

18. The cable of claim 17, further comprising anti-stretch Kevlar fibers.

19. The cable of claim 17, further comprising at least one ground wire.

20. The cable of claim 17, further comprising an outer covering to provide for a unitary cable from the first end to the second end.

\* \* \* \* \*